US005647927A

United States Patent [19]
Mason

[11] Patent Number: 5,647,927
[45] Date of Patent: Jul. 15, 1997

[54] CENTRAL TIRE INFLATION CONTROLLER

[75] Inventor: George L. Mason, Vicksburg, Miss.

[73] Assignee: United States Army Corps of Engineers as represented by the Secretary of the Army, Washington, D.C.

[21] Appl. No.: 493,024

[22] Filed: Jun. 21, 1995

[51] Int. Cl.⁶ ................................................ B60C 23/00
[52] U.S. Cl. ............................................ 152/415; 364/558
[58] Field of Search .................................. 152/415, 416; 340/442, 444; 73/146.2, 146.3, 146.4; 364/558

[56] References Cited

U.S. PATENT DOCUMENTS

| | | | |
|---|---|---|---|
| 4,313,483 | 2/1982 | Brockmann | 152/416 |
| 4,431,043 | 2/1984 | Goodell et al. | 152/417 |
| 5,327,346 | 7/1994 | Goodell | 152/416 X |

OTHER PUBLICATIONS

Hodges Transportation Inc., "Central Tire Inflation System, Literature and Market Searches," Aug. 1984, pp. 1–204.

Primary Examiner—Michael W. Ball
Assistant Examiner—Francis J. Lorin
Attorney, Agent, or Firm—Luther A. Marsh

[57] ABSTRACT

A digital computer computes the optimum air pressure in the tires of a vehicle which minimizes fuel consumption, tire wear, and road deterioration, and transmits to a pressurized air supply system an output signal for adjusting the tire pressure to this optimum tire pressure. The computer uses input from sensors including both vehicle speed and acceleration.

8 Claims, 1 Drawing Sheet

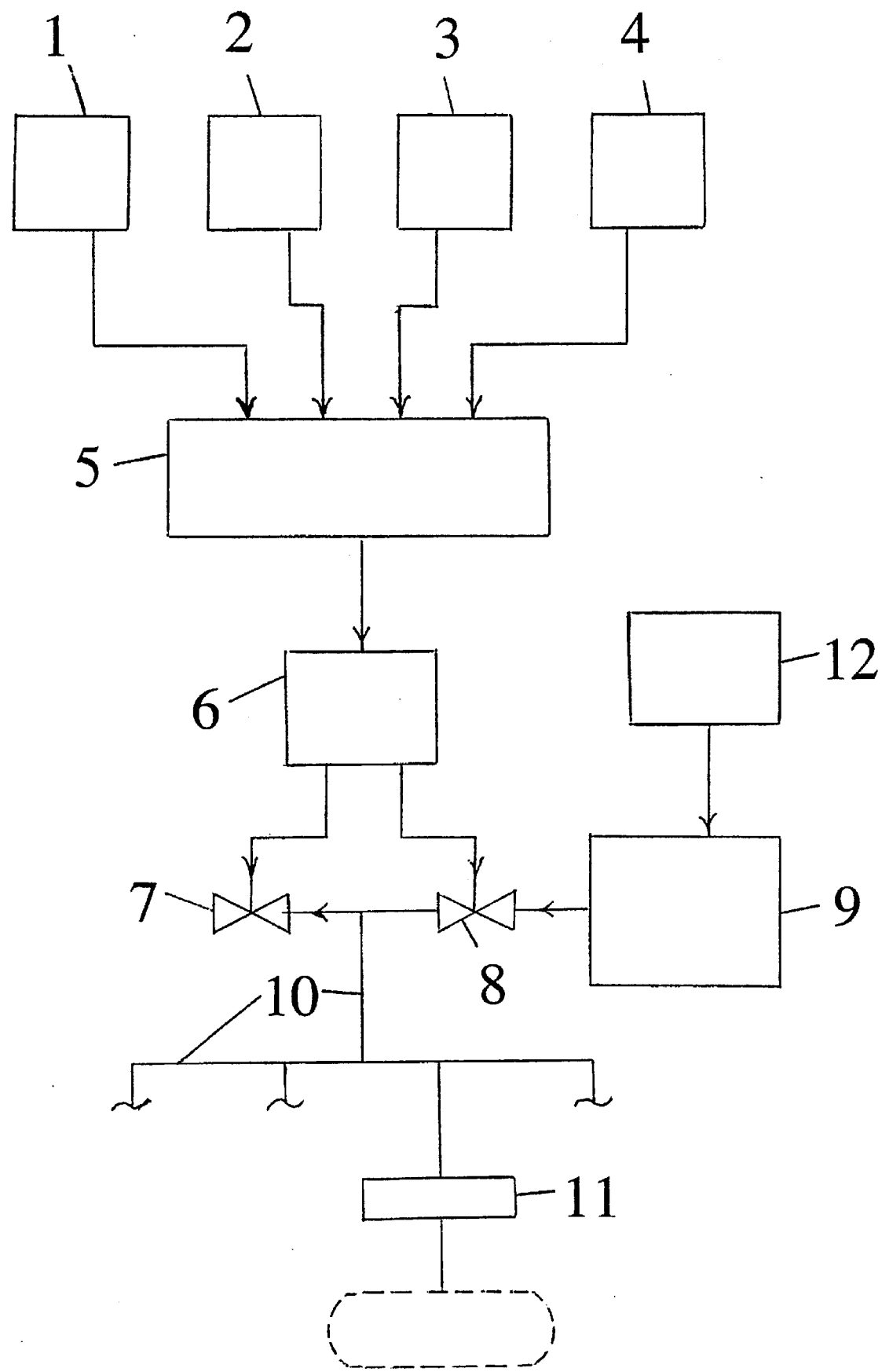

CENTRAL TIRE INFLATION CONTROLLER

GOVERNMENT INTEREST STATEMENT

The invention described herein may be manufactured, licensed, and used by or for government purposes without the payment of any royalties thereon.

BACKGROUND OF THE INVENTION

1. Field of Invention

This invention relates to an automatic tire inflation system for automobiles. More specifically, it relates to a tire inflation system for heavy vehicles, such as trucks and vehicles carrying heavy equipment, in which the tire pressure may be automatically maintained at a level at which fuel consumption, tire wear and road deterioration are minimized.

2. Prior Art

During World War II, the United States military services developed a system for automatically inflating vehicle tires while in transit. This system is referred to as "Central Tire Inflation System." Its purpose was to allow the driver of the vehicle to inflate the vehicle's tires to a higher air pressure, or to lower the air pressure in the tires, to accommodate a variety of road conditions ranging from sandy beaches to dirt roads. Control of the vehicle tire air pressure is provided by an air pressure controller which can be manually adjusted in the cab of the vehicle by the driver. The system provides an air compressor, driven by the vehicle's engine, which is connected through the air pressure controller to the vehicle's front and rear tires. Rotary seal connections are provided at each wheel to allow the flow of air from the air supply to the tires while the vehicle is in motion and its wheels are rotating. Systems for regulating tire air pressure are disclosed in U.S. Pat. Nos. 4,313,483 and 4,431,043.

It is known that tire pressure has an effect on road traction, fuel economy, tire wear, and road deterioration at different vehicle speeds and accelerations, rear axle torque, and for different vehicle weights. However, no use has been made of these known relationships to minimize fuel consumption, tire wear, and road deterioration by automatic means. There is a need, therefore, of apparatus and methods for accomplishing these goals.

SUMMARY OF THE INVENTION

It has now been determined that, by controlling the air pressure in the tires of a vehicle at an optimum level by means of the Central Tire Inflation System in conjunction with sensing and computing means, vehicle fuel consumption, tire wear, and road deterioration may be minimized. This is accomplished by sensors for vehicle speed and acceleration, the rate of rotation of the engine (rpm), and the torque delivered to the drive shaft. The outputs of these sensors are fed to interfaces on a digital microcomputer. This computer is programmed to compute the optimum tire pressure which minimizes fuel consumption, tire wear, and road deterioration.

The term "vehicle" as used herein denotes a variety of vehicles ranging from small to heavy vehicles using air-inflated tires and having front-wheel, rear- wheel, and four-wheel drive.

BRIEF DESCRIPTION OF THE DRAWING

The FIGURE is a schematic diagram showing the components of the apparatus of this invention.

DETAILED DESCRIPTION OF THE INVENTION

With reference to the FIGURE, there is provided in a vehicle, means for determining the speed of the vehicle, such as a speedometer, 1, providing an output signal commensurate with the speed of the vehicle. There is further provided means for determining the accelation of the vehicle, such as an accelerometer, 2, providing an output signal indicating the rate at which the vehicle is accelerating in a forward direction. There is provided means for indicating the rate of rotation of the engine, such as a tachometer, 3, for indicating the "rpm" of the engine, and providing an output signal commensurate with the engine's rpm. Finally, there is provided a torque sensor, 4, mounted on the drive shaft and providing a measurement of the torque transmitted via the vehicle's transmission to the drive shaft and, thereby, via the drive shaft to the wheels of the vehicle, and providing an output signal commensurate with the torque.

These four measurements are provided in analog form, generally as electrical currents or voltages, to a digital computer 5 with means for converting analog input signals into digital form, and programmed to compute the optimum tire pressure on the basis of empirical algebraic expressions and logic functions. The computation of optimum tire pressure is carried out at periodic time intervals on the basis of the input signal values for the preceding interval, and a signal for the optimum tire pressure is transmitted to an air pressure controller 6 as further discussed below.

The program in the computer 5 computes a number of derived variables as a means of determining optimum tire pressure. An empirical equation for computing tire temperature computes the estimated tire temperature from the vehicle speed, actual tire pressure, and time. This eliminates the technically-awkward and costly installation of temperature sensors in the tires and the transmission of temperature signals to the controller. The rate of tire temperature change is computed by subtraction of the computed temperature for each time interval from its previous value and division by the time of the control interval. If the rate of tire temperature rise exceeds a critical value, the time of the control interval may optionally be shortened, i.e. the frequency of optimum tire pressure computation may be increased.

Other derived variables computed by the program include the ride level, an empirical function of acceleration and vehicle speed; and mobility index, an empirical function of vehicle speed, torque, and engine rpm (revolutions per minute). The rates of change of these derived variables may optionally also be computed. Estimated fuel consumption is calculated as an empirical function of vehicle speed, torque, and engine rpm. For each of these derived variables, an optimum value of tire pressure is computed, and a criterion is provided for selecting from among these values the single value for optimum tire pressure. For example, the lowest value among the computed optimum tire pressures may be selected.

The optimum tire pressure output from the computer 5 is transmitted to an air pressure controller 6, which operates two valves 7 and 8. Valve 8, when open, admits air from an air reservoir 9, maintained at 20–100 psig of air pressure, and raises the air pressure in the tires. Valve 7, when open, allows air to bleed to the atmosphere, thereby lowering the air pressure in the tires. The air reservoir 9 is connected to the vehicle tires by tubing 10 and rotary seals 11 at each wheel. The positioning of the valves 7 and 8 may be by pneumatic, hydraulic, or electrical means.

Air pressure is maintained in the air reservoir 9 by an air compressor 12, which is driven by the vehicle's engine. In the event of air compressor failure, as evidenced by the impossibility of maintaining the air pressure in the reservoir at its desired level, the computer is programmed to output a high optimum tire pressure, thereby causing the air pressure controller to close the air bleed valve and preventing the vehicle from being stranded with flat tires. To implement this feature, analog signals for the actual air pressure in the tires and the air pressure in the reservoir are provided to the computer, digitized, and used in the program logic. The Central Tire Inflation System including the components disclosed in U.S. Pat. Nos. 4,313,483 and 4,431,043 are incorporated herewith by reference.

While the preferred embodiment of the invention has been illustrated and described in detail herein, it will be apparent that changes and additions may be made therein and thereto without departing from the spirit of the invention. Reference should, accordingly, be made to the appended claims in determining the true scope of the invention.

What is claimed is:

1. An improved apparatus for maintaining optimum air pressure in the tires of a vehicle having a Central Tire Inflation System, which provides compressed air for inflating the tires of the vehicle, comprising (a) means for determining the speed of a vehicle and transmitting an output signal commensurate therewith to a computer;

(b) means for determining the acceleration of a vehicle and transmitting an output signal commensurate therewith to the computer;

(c) said computer computing an optimum tire pressure for the vehicle from the signals transmitted by (a) and (b), by a set of empirical equations, and generating an output signal commensurate with said optimum tire pressure;

(d) a pressure controller connected to, and responsive to, the optimum tire pressure signal provided by the computer;

(e) an air supply valve actuated by an input from the pressure controller for inflating the tires;

(f) an air bleed valve actuated by a input from the pressure controller for deflating the tires; whereby the air pressure in the vehicle's tires is maintained at the optimum tire pressure computed by the computer.

2. Apparatus in accordance with claim 1 further comprising means for determining the rate of rotation of the vehicle's engine and transmitting an output signal commensurate therewith to the computer.

3. Apparatus in accordance with claim 1 further comprising means for determining the torque delivered to the vehicle's drive shaft and transmitting an output signal commensurate therewith to the computer.

4. Apparatus in accordance with claim 1 wherein the signal outputs transmitted to the computer are converted from analog to digital form and optimum tire pressure is computed digitally by a set of empirical equations.

5. Apparatus in accordance with claim 1 further comprising a pressurized air supply having an air reservoir and an air compressor.

6. A method of maintaining the optimum air pressure in the tires of a vehicle utilizing the apparatus of claim 1 and comprising the steps of (a) determining the speed of the vehicle and transmitting a signal commensurate therewith to the computer;

(b) determining the acceleration of the vehicle and transmitting a signal commensurate therewith to the computer;

(c) allowing the computer to compute the optimum tire pressure;

(d) adjusting the tire pressure to the computed optimum tire pressure.

7. The method of claim 6 further comprising determining the rate of rotation of the vehicle's engine and transmitting a signal commensurate therewith to the computer.

8. The method of claim 6 further comprising determining the torque delivered to the vehicle's drive shaft and transmitting a signal commensurate therewith to the computer.

* * * * *